US00RE34287E

United States Patent [19]

Berner et al.

[11] E Patent Number: Re. 34,287

[45] Reissued Date of Patent: Jun. 22, 1993

[54] WINDOW OPERATOR

[75] Inventors: John M. Berner, Golden Valley; Eric C. Stender, New Hope; Frank W. Campbell, Brooklyn Center; Allen J. Alden, Elk River, all of Minn.

[73] Assignee: Truth Division of SPX Corporation, Owatonna, Minn.

[21] Appl. No.: 739,530

[22] Filed: Aug. 2, 1991

Related U.S. Patent Documents

Reissue of:

[64] Patent No.: 4,945,678
Issued: Aug. 7, 1990
Appl. No.: 280,590
Filed: Dec. 5, 1988

[51] Int. Cl.[5] ..... E05D 13/04

[52] U.S. Cl. ..... 49/322; 49/325; 49/279; 192/56 R; 192/150

[58] Field of Search ..... 49/28, 322, 325, 279, 49/26, 340, 341, 342, 447, 449, 452; 192/56 R, 89 A, 150; 52/66, 72; 317/16

[56] References Cited

U.S. PATENT DOCUMENTS

| | | | |
|---|---|---|---|
| 2,905,464 | 9/1959 | Shaw | 268/110 |
| 3,090,613 | 5/1963 | Bechtold . | |
| 3,429,406 | 2/1969 | Cary | 192/34 |
| 3,898,816 | 8/1975 | Lindahl et al. . | |
| 3,942,073 | 3/1976 | Lafontaine . | |
| 4,159,598 | 7/1979 | Gatland | 49/28 |
| 4,403,449 | 9/1983 | Richmond . | |
| 4,481,735 | 11/1984 | Jentoft | 49/325 |
| 4,521,993 | 6/1985 | Tacheny et al. | 49/325 |
| 4,553,656 | 11/1985 | Lense | 192/142 |
| 4,860,493 | 8/1989 | Lense | 49/279 |

FOREIGN PATENT DOCUMENTS

| | | |
|---|---|---|
| 620193 | 3/1946 | United Kingdom . |
| 1084704 | 9/1967 | United Kingdom . |
| 1217793 | 6/1968 | United Kingdom . |
| 1592748 | 9/1977 | United Kingdom . |
| 1531881 | 11/1987 | United Kingdom . |

*Primary Examiner*—Kenneth J. Dorner
*Assistant Examiner*—Gerald A. Anderson
*Attorney, Agent, or Firm*—Wood, Phillips, VanSanten, Hoffman & Ertel

[57] ABSTRACT

A window operator has a prime mover for opening and closing of a window, with the prime mover being drivingly connected to a drive output member through an intermediate gear structure. A clutch device in the drive structure senses the torque applied to the drive output member in a window closing operation and a switch operable by the clutch is effective to deenergize the prime mover when the torque applied to the output member reaches a predetermined value. The switch can be adjustably located relative to the clutch whereby the predetermined value at which the motor will be deenergized may be varied in order to obtain a desired tension on a member connected to the closed sash of the window, such as a chain connected to the sash of a skylight window.

5 Claims, 2 Drawing Sheets

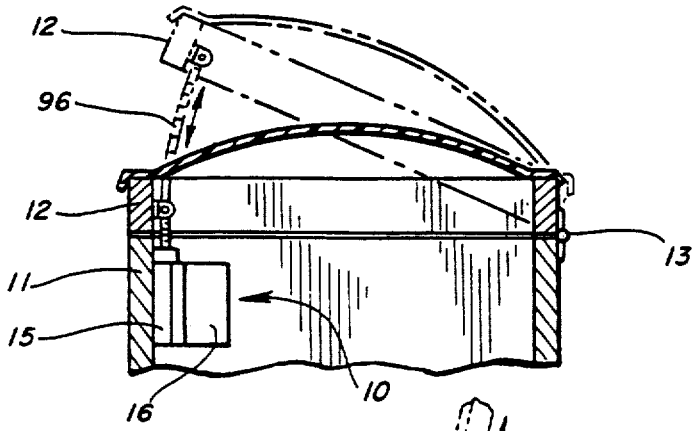
FIG. 1
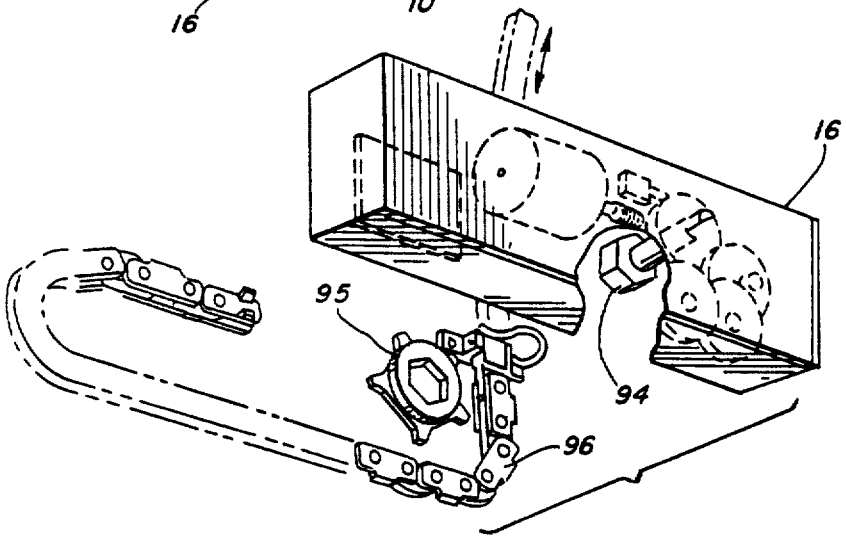
FIG. 2
FIG. 3
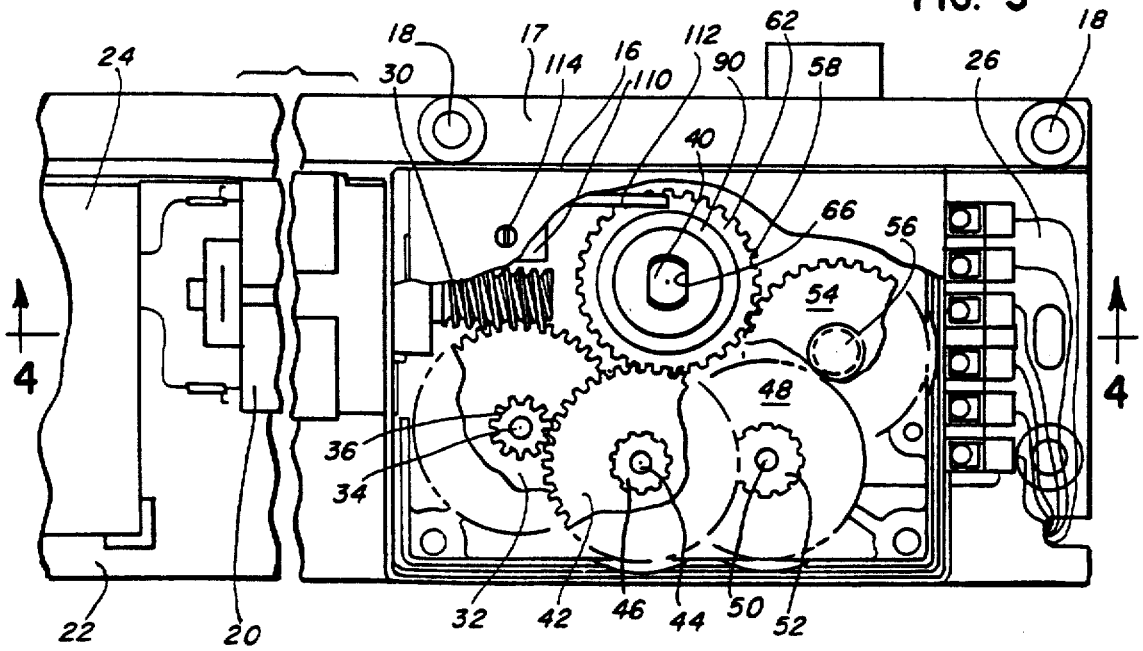

WINDOW OPERATOR

Matter enclosed in heavy brackets [ ] appears in the original patent but forms no part of this reissue specification; matter printed in italics indicates the additions made by reissue.

BACKGROUND OF THE INVENTION

This invention pertains to a new and improved window operator and, more particularly, to a window operator for a window, such as a skylight window, wherein a power unit can cause extension and retraction of a chain connected to a movable sash of the window for causing opening and closing movement of the window sash. Window operators for skylight windows are known in the art. An example of such window operator is shown in the Tacheny et al. U.S. Pat. No. 4,521,993, owned by the assignee of this application. The window operator has a chain storable within a housing and with the chain being extended from and retracted into the housing by means of a rotatable drive sprocket having a toothed relation with the chain.

The Tacheny et al. patent discloses a two-part housing with a housing base providing for chain storage, chain guiding, and rotatable mounting of the drive sprocket. An upper part of the housing mounts means for driving the rotatable drive sprocket which can either be a manually operable means or a motor drive, as shown in FIG. 5 of the patent.

The invention disclosed herein relates to an improvement in a power drive for the window operator as shown in the Tacheny et al. patent and the disclosure of the Tacheny et al. patent is incorporated herein by reference.

SUMMARY OF THE INVENTION

A primary feature of the invention is to provide a new and improved window operator which provides for control of the opening and closing movements of the window sash wherein the torque on the chain-driving sprocket can be preset to a value corresponding to a desired chain tension for tight closing of the window.

More particularly, an object of the invention is to provide a window operator which utilizes a prime mover for opening and closing of a window and which is drivingly connected to a drive output member, means in said drive connection sense the torque applied to the drive output member and means operated by the sensing means acts to stop the prime mover when the torque reaches a predetermined value in achieving closing of the window.

The window operator as defined in the preceding paragraph has the sensing means in the form of a clutch with a clutch member movable proportionally to the torque when the torque exceeds a certain level and which is at a level below said predetermined value. This torque sensing is only operable in the closing mode. (The clutch is a one-way type clutch.) In one embodiment of the window operator, a movable clutch member as well as a second clutch member have coacting helical ramps. Separation of the clutch members by coaction between the helical ramps is resisted by spring means and with the spring means yielding to permit movement of the movable clutch member when the torque exceeds said certain level.

The means for stopping the prime mover includes a switch operable by the movable clutch member and said predetermined value of torque at which the prime mover will be stopped is determined by adjustable positioning of the switch relative to the movable clutch member. The movable clutch member will move an increased distance with increasing torque applied to the drive output member and, therefore, the predetermined value of torque can be established by positioning of the limit switch at a level relative to the movable clutch member corresponding to the amount of separating movement of the clutch members which will result from the torque being of said predetermined value.

Another object of the invention is to provide a window operator for moving a window component between fully open and closed positions and any desired position therebetween comprising, a rotatable drive output member, a rotatable drive input member, a gear train between said drive input and drive output members, means for rotating said drive input member, a switch for controlling operation of said rotating means, and means responsive to a closing torque applied to the rotatable drive output member in excess of a predetermined value for operating said switch to deenergize said rotating means.

A further object of the invention is to provide a window operator comprising, a rotatable drive output member, a selectively operable motor, a speed-reducing gear train between said motor and drive output member, a clutch in said gear train including a pair of separable clutch members, means yieldably-holding said clutch members against said separating movement, torque-responsive coacting means on the clutch members for causing progressive increase in the separation of the clutch members against the action of the yieldable holding means as the torque applied to the output member increases above a certain amount, a motor-controlling switch positioned in the path of one of the clutch members, and means for adjustably positioning said switch whereby the amount of said torque effective to operate the switch can be set at a predetermined value.

BRIEF DESCRIPTION OF THE DRAWINGS

FIG. 1 is a central sectional view of a skylight window showing the chain operator mounted to the window, with the window in both closed position and open position;

FIG. 2 is an exploded perspective view of a housing for the window operator;

FIG. 3 is a fragmentary plan view of the window operator with portions of the cover removed;

DESCRIPTION OF THE PREFERRED EMBODIMENT

Figure 4:
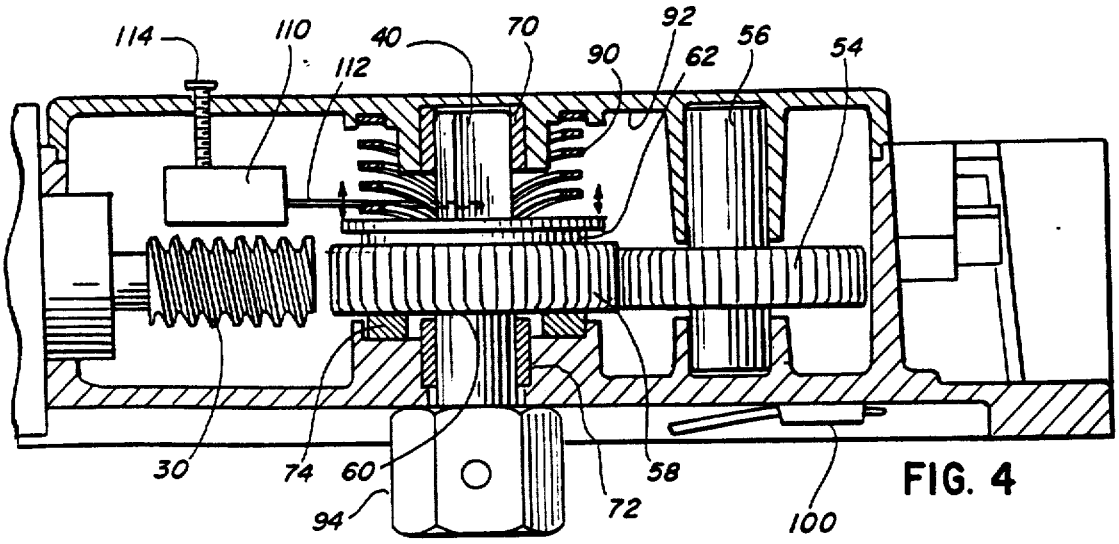
FIG. 4 is a partial sectional view, taken along the line 4—4 of FIG. 3 and with parts removed for clarity.

The window operator, indicated generally at 10 in FIG. 1, is shown mounted for operation of a window and particularly a skylight window having a frame 11 and a sash 12 hinged to the frame at 13. The sash has a dome member 14 which transmits light. The window is shown in solid lines with the sash 12 in the closed position and in dashed lines with the sash 12 in the open position.

The window operator 10, as shown in FIGS. 2–7, has a number of associated components that can be mounted to a base 15, such as the previously-described base of the Tacheny et al. patent. These components include a housing 16 with a flange 17 having suitable openings 18 for receiving attachment members for securing the housing 16 to the base 15.

A prime mover power source, in the form of an electric motor 20, is mounted to the housing 16 at one end thereof and a panel 22, extending beyond the motor 20, mounts a slave controller 24. A wiring harness 26 is located at the opposite end of the housing 10 and with parts of the wiring being associated with the slave controller 24 and with wiring connections between the slave controller 24 and the electric motor 20.

The electric motor 20 has a rotatable drive input member, in the form of a worm gear 30, positioned within the housing and which is geared to a speed-reducing gear train by mesh with a helical gear 32 rotatable on a shaft 34 and which has pinion gear 36 rotatable therewith.

The speed-reducing gear train drivingly interconnects the motor 20 and worm gear 30 with a rotatable drive output member, in the form of a drive shaft 40. This driving connection is through the helical gear 32 and the pinion gear 36, with the latter gear meshing with a spur gear 42. The spur gear 42 is rotatable on a shaft 44 and has a pinion gear 46 which meshes with a spur gear 48 rotatable on a shaft 50. The spur gear 48 has a pinion gear 52 fixed thereto which meshes with a spur gear 54 on an idler shaft 56. The spur gear 54 in addition to meshing with the gear 52 also meshes with the teeth of a peripheral gear 58 extending around the periphery of a lower clutch member 60 of a clutch to be further described.

Figure 5:
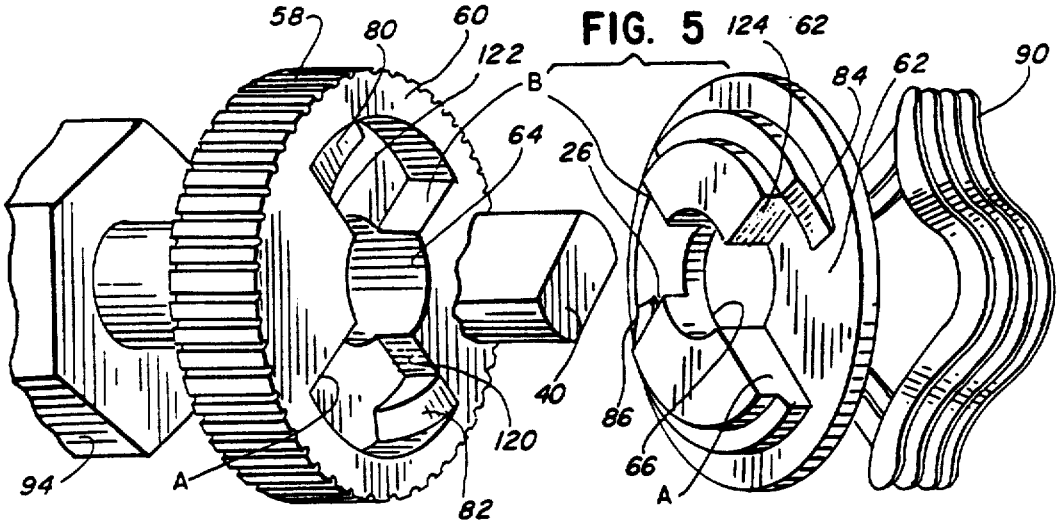
FIG. 5 is an exploded view of a clutch for the window operator of FIGS. 3 and 4.

The clutch has the clutch member 60 which is the lower of two clutch members and also an upper clutch member 62. As seen in FIG. 5, the lower clutch member 60 has a circular opening 64 whereby the clutch member is freely rotatable on the drive output shaft 40. The upper clutch member 62 has a rectangular opening 66 to fit on a portion of the drive output shaft which is rectangular in cross section, as seen in FIGS. 3 and 5. Because of this relation, the upper clutch member 62 has its rotation controlled by the rotational condition of the drive output shaft 40. If the drive output shaft cannot rotate, then the upper clutch member 62 cannot rotate, while the lower clutch member 60 is still free to rotate. The upper clutch member 62 is free to move lengthwise of the drive output shaft 40 and, in an up and down direction, as viewed in FIG. 4.

The drive output shaft 40 is rotatably mounted in the housing by a pair of bushings including an upper bushing 70 and a lower bushing 72. A thrust washer 74 is positioned between the housing and the underside of the lower clutch member 60.

The clutch members 60 and 62 have pairs of coacting helical ramps, with the lower clutch member 60 having the helical ramps 80 and 82 and the upper clutch member 62 having the helical ramps 84 and 86. The clutch members are urged toward each other with the helical ramps thereof in engagement by means of a wave spring 90 captured between the underside of a top part 92 of the housing and the upper side of the upper clutch member 62.

The drive shaft 40 has a drive nut 94 at its lower end and positioned beneath the underside of the housing 10 which is engageable within the hole of a drive sprocket for the chain, such as the drive sprocket 95 shown in FIG. 2 and in the aforesaid Tacheny et al. patent which is incorporated herein by reference.

In operation, energization of the motor 20 in a forward direction results in rotation of the drive output shaft 40 through the speed-reducing gear train and, with the window being closed, the resulting rotation of the drive output shaft results in extension of a chain 96 connected to the window sash 12 for opening movement of the window. The underside of the housing 16 mounts a limit switch 100 positioned for engagement by a suitable member positioned selectively along the chain 96 which will indicate the desired full-open position for the window and, when this member contacts the limit switch 100, the motor 20 will be deenergized.

During the opening mode, the clutch members are drivingly locked together and will not separate in proportion to the applied torque. In the opening mode, vertical surfaces A and B on the clutch members 60 and 62 (FIG. 5) are in contact and directly drive the output shaft. There is no capability for the lower clutch member 60 to rotate relative to the upper clutch member 62 and "sense" the opening torque by elevation of the upper clutch member 62.

Figure 6:
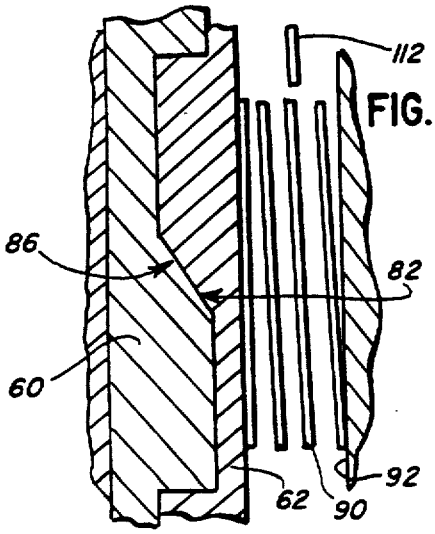
FIG. 6 is a detailed view of the clutch during normal operation.
Figure 7:
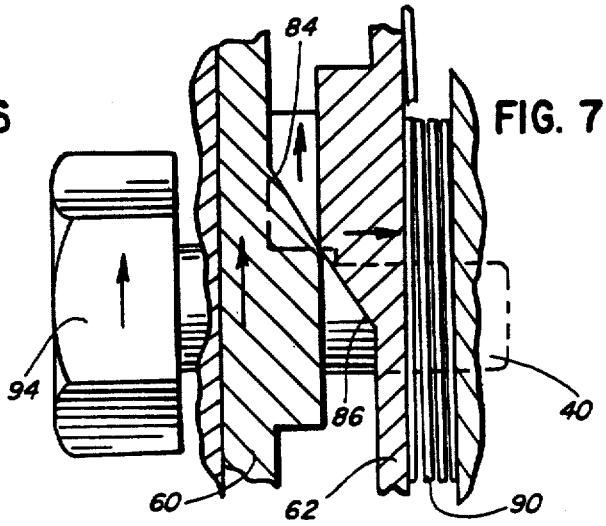
FIG. 7 is a detailed view of the clutch after a preselected torque has been applied to the clutch due to the window being in the closed position.

When the window is to be closed, the motor 20 is energized for rotation in the opposite direction to achieve the reverse direction rotation of the drive output shaft 40, with resulting movement of the chain 96 into the base part of the housing. In order to achieve a desired chain tension for desired closing force on the window sash, the invention has means for sensing the torque on the chain-driving sprocket 95 and the drive output shaft 40 and when this torque reaches a predetermined value the motor 20 is deenergized. The means for sensing the torque comprises the previously-described clutch, with the clutch members 60 and 62. As the window is being closed, the spring means 90 will maintain the helical ramps of the clutch members in engagement, as shown in FIG. 6, and without relative rotation between the clutch members. As soon as the window sash reaches closed position, there is an increase in torque resulting from rotation of the motor 20 which continues to drive the drive output shaft 40 in a window-closing direction. As this torque increases to a certain level, the clutch members will start to separate, as shown in FIG. 7, because of the upper clutch member 62 being held against rotation by the drive output shaft 40 not being able to rotate, while the lower clutch member 60 continues to rotate. This climbing of the helical ramps on each other exerts axial forces axially of the drive output shaft 40 to raise the upper clutch member 62 against the spring means 90.

When the torque on the drive output shaft reaches a predetermined level, as sensed by the upper clutch member 62 having moved to a certain level on the drive output shaft 40, means are effective to deenergize the motor. This means comprises a limit switch 110 having a contact member 112 positioned in the path of the upper clutch member 62. Engagement of the contact member 112 by the upper clutch member 62 changes the condition of the switch 110, with the result that the motor 20 is deenergized. As the inertia of the motor is dissipated, there can be a slight further rise in the movement of the upper clutch member 62.

The desired tension on the chain 96, which is indicated by the torque on the output drive shaft 40 reaching a predetermined level, can be varied and preselected by adjusting the level of the switch 110. The body of the switch 110 is suspended from the top of the housing by an adjusting screw 114 with rotation of this screw providing for varying the level of the switch 110. As the level of the switch 110 is raised, there is a resulting increase in the predetermined value of torque, at which time the motor 20 will be deenergized. This is because there is a requirement for a greater torque value to cause a greater upward movement of the upper clutch member 62 prior to engaging the contact member 112 of the switch.

The lower clutch member 60 includes vertical surfaces 120 and 122. The upper clutch member 62 includes similar vertical surfaces 124 and 126. The vertical surfaces 120 and 124, and 122 and 126 match each other and are in abutting relation to preclude relative rotation between the clutch members 60 and 62 when there is an externally applied window component opening force, as by a burglar attempting to open the window. Specifically, any such force applied to the chain 96 tries to rotate the sprocket 95 and the drive nut 94 in the selected direction. However, the respective vertical surfaces engage one another and there is no axial movement of the upper clutch member 62.

We claim:

1. A window operator for moving a window component between fully open and closed positions and any desired position therebetween, comprising:

a rotatable drive output member;

a rotatable drive input member;

a gear train between said drive input and drive output members;

means for rotating said drive input member;

a switch for controlling operation of said rotating means;

means responsive to a closing torque applied to the rotatable drive output member in excess of a predetermined value for operating said switch to deenergize said rotating means;

a clutch associated with said drive output member;

spring means acting on said clutch to maintain a drive through said clutch, said clutch including a pair of clutch members urged toward each other by said spring means, said clutch members having [coating] *coacting* stops to prevent rotation of the clutch members and gear train in response to an externally-applied window component opening force;

[coating] *coacting* helical ramps on said clutch members which cause progressive separating movement therebetween when said closing torque exceeds the force of said spring means holding the clutch members against movement; and means adjustably mounting said switch in the path of the clutch member which moves as the clutch members separate to establish said predetermined torque value.

2. A window operator as defined in claim 1 wherein said coacting stops comprise vertical surfaces disposed in abutting relation on each of said clutch members, whereby relative rotation between said members in a direction representative of a window opening direction is precluded.

3. A window operator as defined in claim 1 wherein said vertical surfaces are further adapted to provide fixed rotation of each of said clutch members when drive torque is internally-applied to said drive input members in a direction representative of a window opening.

4. A window operator comprising:

a rotatable drive output member;

a selectively operable motor;

a speed-reducing gear train between said [drive input] *motor* and *said* drive output [members] *member;* a clutch in said gear train including a pair of separable clutch members;

means yieldably-holding said clutch members against said separating movement;

a torque-responsive coacting means on the clutch members for causing progressive increase in the separation of the clutch members against the action of the yieldable holding means in a direction representative of only closing the window as the torque applied to the output member increases above a certain amount;

a motor-controlling switch positioned in the path of one of the clutch members; and means for adjustably positioning said switch whereby the amount of said torque effective to operate the switch can be set at a predetermined value *to ensure that a minimum selected torque be applied to the output member to effect tight closing of the window.*

5. A window operator for moving a window component between fully open and closed positions and any desired position therebetween comprising;

a rotatable drive output member;

a rotatable drive input member;

a gear train between said drive input and drive output members;

means for rotating said drive input member;

a switch for controlling operation of said rotating means; and means responsive to a closing torque applied to the rotatable drive output member in excess of a predetermined value for operating said switch to deenergize said rotating means, said responsive means including a clutch having a pair of clutch members urged toward each other by spring means, and anti-backdrive means adapted to prevent rotation of the clutch members and gear train in response to an externally-applied window component opening force.

* * * * *